Feb. 3, 1942.    G. A. CARLSON    2,272,055
POLISHING AND GRINDING MACHINE
Filed April 12, 1939    3 Sheets-Sheet 1

INVENTOR.
Gustave A. Carlson
BY
J. Windsor Davis
ATTORNEY.

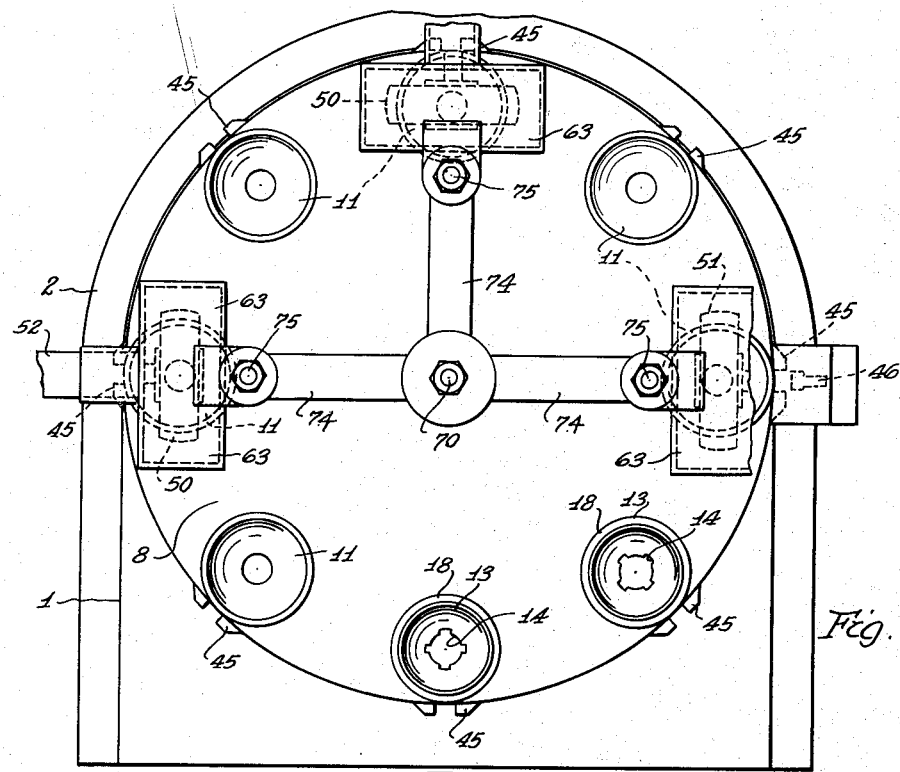
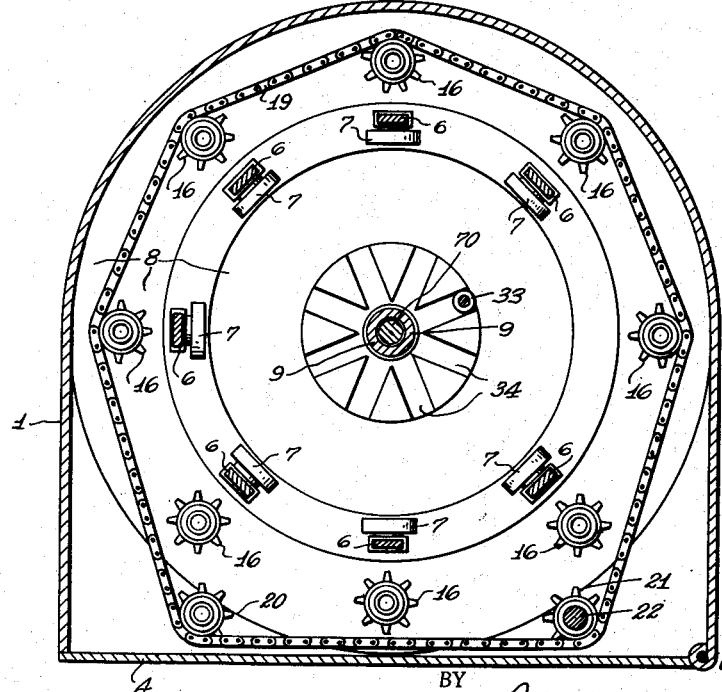
Fig. 2.
Fig. 3.
INVENTOR.
Gustave A. Carlson
BY
ATTORNEY.

Feb. 3, 1942. G. A. CARLSON 2,272,055
POLISHING AND GRINDING MACHINE
Filed April 12, 1939 3 Sheets-Sheet 3

INVENTOR.
Gustave A. Carlson
BY
Windsor Davis
ATTORNEY.

Patented Feb. 3, 1942

2,272,055

UNITED STATES PATENT OFFICE 2,272,055

POLISHING AND GRINDING MACHINE

Gustave A. Carlson, Detroit, Mich.

Application April 12, 1939, Serial No. 267,470

3 Claims. (Cl. 51—108)

This invention relates to machines for polishing, buffing, grinding and analogous operations and has for its primary object to provide a machine having a multiplicity of work performing members or stations, a multiplicity of work holders adapted to be moved successively into a position adjacent each work performing member, and means for causing relative movement between the work performing members and the work holders to cause simultaneous operation of all work performing members in conjunction with an equal number of work pieces on the holders positioned adjacent thereto.

In a machine of the type here concerned, wherein a circular series of work holders are presented successively to a series of work performing members, the shape of the piece being worked upon sometimes requires separation of the work performing member from the work piece. For example, in the case of a concave work piece it is necessary to insert the work performing member into the concavity, and to retract the work performing member prior to movement of the work holder toward its next successive work station. In another case, where the concavity is of such size and shape that the work performing member cannot contact both sides at the same time, it is desirable to move the work across the work performing member, and to elevate or lower the work performing member according to the contour of the work piece. It is with these conditions the invention is more particularly concerned.

More specifically stated, the main object is to provide means operable in synchronism with a machine of this character for controlling the relative positions of the work performing members and the work holders, either to separate the work performing members from the work pieces to permit indexing movement of the work holders relative to the work performing members, or to move the work performing members according to the contour of work pieces while the work pieces traverse the work performing members.

Another object is to provide a machine having a multiplicity of work performing members, a rotatable table having a multiplicity of work holders thereon adapted to be presented to the work holders successively by rotation of the table, and means for separating the work performing members from the work holders while the table is in motion, and for placing the work holders in operative relationship with work pieces on the holders when the table is stationary. Means similar to that shown in my co-pending application Serial No. 220,767, filed July 22, 1938, now Patent No. 2,166,859, dated July 18, 1939, is employed to index the table relative to the work performing members. In said patent, the type of work concerned does not require separation of the work performing members from the work piece prior to indexing movement. In the present case, the work performing members are elevated immediately prior to indexing movement and are lowered again immediately after the completion of indexing movement.

Other objects and advantages will become more fully apparent as reference is had to the accompanying drawings wherein my invention is illustrated, and in which:

Fig. 2 is a plan,

Figures 1, 6:
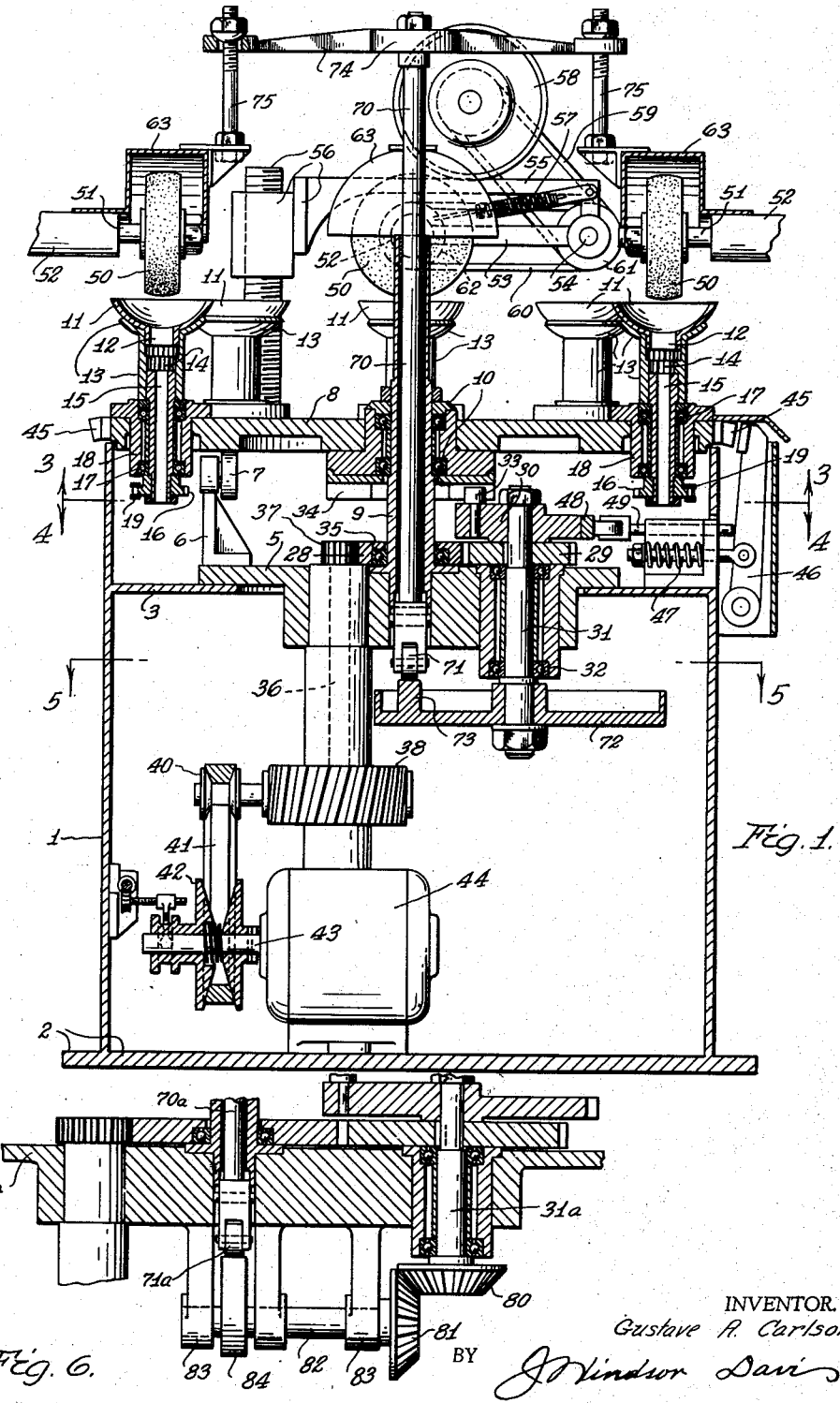
Fig. 1 is a vertical section.
Figure 4:
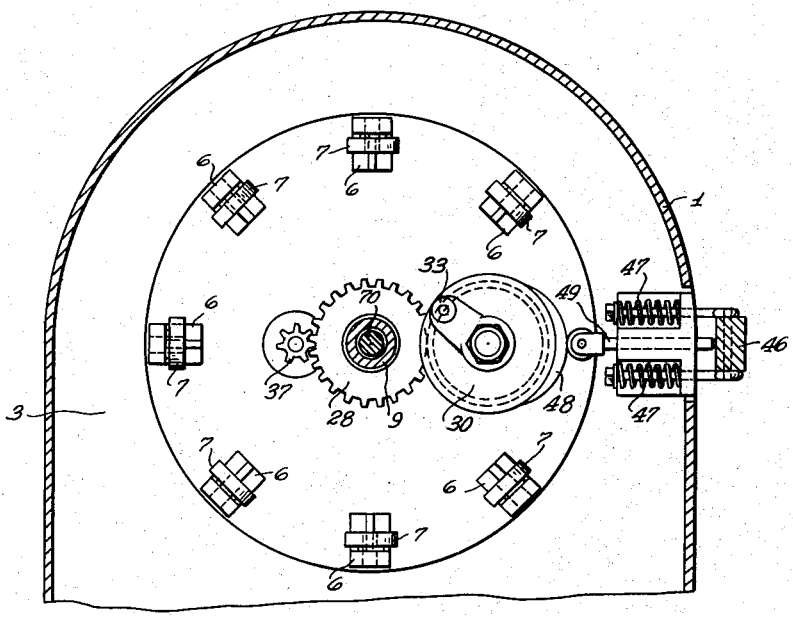
Figure 5:
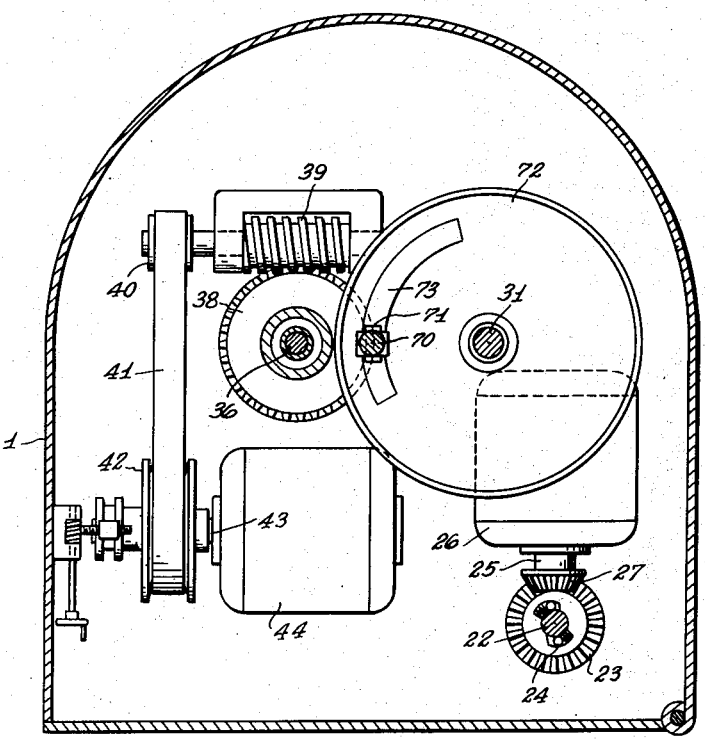

Figs. 3, 4 and 5 are sections taken on lines 3—3, 4—4 and 5—5, respectively, of Fig. 1, and Fig. 6 is a fragmental section illustrating modification of the cam means to suit a machine of increased size.

More particularly, 1 designates a hollow, box-like base structure having a bottom wall 2, a transverse horizontal wall 3, and a hinged front wall 4 enabling access thereto. The base structure constitutes a housing for the supporting and actuating members hereinafter described.

Supported within the housing 1 by the transverse wall 3 is a main bracket 5 having a plurality of brackets 6 thereon which carry rollers 7. A table 8 is supported by the rollers 7 for rotation about a hollow vertical shaft 9 as an axis, the shaft being mounted in the main bracket 5, and the table being journalled on the shaft by anti-friction bearings 10.

Mounted in a circular series on the table 8 are the work holders which carry the work pieces into position adjacent the work performing members. In the illustrated embodiment, the work pieces 11 are concave and have an axial extension 12, and an adapter 13 is shaped to receive the work piece. Each adapter 13 is internally splined at 14 and is telescoped over the upper splined end of a shaft 15 which carries a sprocket 16 on its lower end. Each shaft 15 is journalled in anti-friction bearings 17 in a housing 18 removably attached to the table 8. The housings 18 are removable in order that the entire work support may be removed as a unit if desired.

The means for rotating the sprockets 16 is similar to that shown in my application Serial No. 220,767. It comprises an endless chain 19 supported by the sprockets 16, by an idler sprocket 20, and by a driving sprocket 21. As may be seen in Fig. 3, the idler 20 and the driving sprocket 21 are so disposed that during a portion of travel with the table 8 the sprockets 16 are carried out of mesh with the chain. For example, in Fig. 3 the three sprockets nearest the bottom of the view are out of contact with the chain 19 and therefore remain idle in the presence of chain movement.

The sprocket 21 is mounted upon a vertical shaft 22 having a bevelled gear 23 connected thereto by an over-riding clutch mechanism 24. The bevelled gear 23 is driven by a similar gear 27 on the shaft 25 of an electric motor 26, and upon operation of the motor 26 the chain 19 rotates the sprockets 16 which are in contact therewith. The over-riding clutch permits the chain to run faster than the motor and therefore as the table is rotated, by means hereinafter described, the chain may be carried by the sprockets 16, and the work holders may become stationary.

The table 8 is intermittently moved rotatively by a Geneva movement, comprising a disc 30 mounted on a vertical shaft 31 journalled in bearings 32 in the main bracket 5. An eccentric roller 33 engages Geneva ways 34 to intermittently rotate the table 8 a fraction of a revolution with each revolution of the disc 30.

The driving means for the disc 30 comprises a gear 29 keyed on the shaft 31 and meshing with an idler gear 28 which is rotatably journalled on the hollow vertical shaft 9 by bearings 35. A vertical shaft 36 has a pinion 37 on its upper end meshing with the idler gear 28 and a worm gear 38 on its lower end meshing with a worm 39. The worm 39 has a pulley 40 connected thereto and driven by a belt 41 from a pulley 42 on the drive shaft 43 of an electric motor 44. The pulley 42 is of the well known type embodying two separable conical walls axially adjustable to vary the effective diameter of the pulley, and thus provides for variation of the speed of the pulley 40 and the speed of movement of the table 8.

In order to hold the table 8 against accidental movement between the operative periods of the Geneva mechanism, a series of locking lugs 45 are mounted about the periphery of the table. A latch member 46 is normally biased to a position for engagement with the lugs 45 by springs 47, and as the table 8 is moved the sets of lugs are successively placed in a position for engagement by the latch member. To retract the latch member at the time of operation of the Geneva movement, a cam 48 is mounted on the disc 30 and reciprocates a plunger 49 to force the latch member out of engagement with lugs positioned adjacent thereto. By mounting the cam 48 on the same disc 30 that carries the table moving roller 33 proper timed relationship between the Geneva movement and the latch is assured.

As the table is intermittently moved and stopped the work holders are successively presented to a series of stations. At some of these stations the sprockets 16 are in mesh with the chain 19 and are, therefore, rotated, while at the remaining stations the sprockets 16, being out of mesh with the chain 19 become stationary. The work holders are rotated at the work stations, and become stationary at loading station. In some cases a work performing member is provided at each work station, as is the case in the co-pending applications above referred to. However, in the present case, a work performing member is provided at every other work station.

The work performing members in the present case comprise unitary machines each embodying an adjustably supported, vertically movable buffing wheel. Machines for this purpose are shown and claimed in my prior Patents 2,106,082 of January 18, 1938, and 2,203,488. It is deemed unnecessary, therefore, to illustrate the construction of the work performing units in detail, and the disclosure in this respect is more or less schematic.

As illustrated in Fig. 2, there are three buffing wheels 50 grouped about the present machine, and in this view the supporting and operating means has been broken away and omitted. The wheel supporting and operating means may be of the type shown in either of the patents above referred to. In Fig. 1, where the wheels 50 are also shown, one supporting and operating means has been illustrated, and it is believed that from this illustration the construction of the other two will be readily apparent inasmuch as all three of the wheel supporting and operating means are identical. The unit disclosed here, and in the above mentioned patents, are known to the trade as "lathes," and are usually purchased separate from the machine with which they are used.

Referring to Fig. 1, each work performing unit comprises a buffing wheel 50 mounted on a shaft 51. The shaft 51 is rotatable in a bearing 52 on the outer end of an arm 53 which swings about a trunnion 54 on a bracket 55 carried by a vertically adjustable support 56. A counterbalance spring 57 acts between the free end of the arm 53 and the bracket 55 to counterbalance the weight thereof and of the wheel. A motor 58 is mounted on the bracket 55 and through belts 59 and 60 and pulleys 61 and 62 rotates the shaft 51 and the buffing wheel 50. Each buffing wheel 50 is covered by a guard housing 63 which is attached to the bearing 52.

In view of the concaved nature of the work pieces 11, it is necessary to remove the buffing wheels from the concavity prior to indexing movement of the work table 8, and to lower it into the concavity when indexing movement is completed. To provide this function a shaft 70 is slidably mounted in the hollow vertical shaft 9, and on its lower end is mounted a roller 71 which rides upon a disc 72 having a cam 73 thereon. The disc 72 is mounted on the lower end of the shaft 31 which operates the Geneva movement and the latch as above described.

On the upper end of the shaft 70 is a spider 74 having a number of radial arms corresponding to the number of work performing units. Each arm of the spider is connected by a depending link 75 to the adjacent guard housing 63, and as the disc 72 rotates in timed relation with the Geneva movement and the latch the cam 73 elevates and lowers the shaft 70.

In the described embodiment the cam 73 elevates and lowers the buffing wheels 50 while the table is stationary, but inasmuch as operation of the cam is not dependent upon rotation of the table it would operate if the table rotated continuously as shown in my application Serial No. 216,697 filed June 30, 1938. The cam here shown is designed to reciprocate the shaft 70 once with each revolution of the disc, but it is obvious that the cam might be shaped to provide a multiplicity of reciprocations of the same or varying length. In such a case, the wheels 50 might be elevated and lowered to suit the contour of continuously moving work pieces.

The machine here shown is of comparatively small diameter in which case the disc 72 and cam 73 constitute the preferred means for moving the shaft 70 vertically. In larger machines, where the distance between the shafts 31 and 70 is comparatively great, a cam arrangement such as shown in Fig. 6 is preferred. As shown in Fig. 6, the shaft 31a has a bevelled gear 80 meshing with a bevelled gear 81 on a horizontal shaft 82 supported from the main bracket 8a by bearings 83. An eccentric type cam 84 is mounted on the shaft 82 and engages the roller 71a on the vertically movable rod 70a. In this form the eccentric or cam 84 is firmly supported by location of journal bearings on opposite sides thereof and in close proximity therewith.

It is apparent from the foregoing that the work pieces are rotated while positioned at a work station. In the case of work pieces having a spherical concavity the buffing wheels 50 offer no interference to such movement, but it is obvious that the work pieces might have a shape such that interference would take place. The cam means for controlling the position of the wheels 50, being operated independently of table movement, may be given a shape such that it elevates and lowers the wheels according to the contour of the work piece, so as to avoid interference to movement of the work piece such as takes place while it is being worked upon.

What is claimed is:

1. The combination of a work table mounted for rotation about an axis, work supporting means positioned at intervals around said table for presenting work pieces to different stations as a result of rotation of the table, a hollow axis member confining rotation of said table to a vertical axis, a shaft reciprocable in said hollow axis member and extending above and below the table, work appurtenant means carried by the upper portion of said shaft and adapted to be lowered thereby for contact with work pieces on said work supporting means and adapted to be raised thereby to clear the work pieces and permit movement thereof from one station to another, a Geneva movement for rotating said table intermittently, and a cam connected to the constantly moving element of the Geneva movement for elevating said shaft and the work performing member during rotation of the table.

2. The combination of a work table mounted for rotation about an axis, work supporting means positioned at intervals around said table for presenting work pieces to different stations as a result of rotation of the table, a hollow axis member confining rotation of said table to a vertical axis, a shaft reciprocable in said hollow axis member and extending above and below the table, work appurtenant means carried by the upper portion of said shaft and adapted to be lowered thereby for contact with work pieces on said work supporting means and adapted to be raised thereby to clear the work pieces and permit movement thereof from one station to another, a Geneva movement for rotating said table intermittently, and a cam connected to the constantly moving element of the Geneva movement for elevating and lowering said shaft, said cam being constructed to lower said shaft when the table is stationary and to elevate the shaft before resumption of rotary movement of the table.

3. The combination of a work table mounted for rotation about an axis, work supporting means positioned at intervals around said table for presenting work pieces to different stations as a result of rotation of the table, a hollow axis member confining rotation of said table to a vertical axis, a shaft reciprocable in said hollow axis member and extending above and below the table, work appurtenant means carried by the upper portion of said shaft and adapted to be lowered thereby for contact with work pieces on said work supporting means and adapted to be raised thereby to clear the work pieces and permit movement thereof from one station to another, a Geneva movement for rotating said table intermittently, and a cam connected to the constantly moving element of the Geneva movement for elevating and lowering said shaft, said cam being constructed to lower said shaft when the table is stationary and to elevate the shaft after resumption of movement of the table has been initiated.

GUSTAVE A. CARLSON.